(12) United States Patent
Banno et al.

(10) Patent No.: US 6,691,017 B2
(45) Date of Patent: Feb. 10, 2004

(54) VEHICLE BEHAVIOR CONTROL DEVICE

(75) Inventors: Masaki Banno, Nagoya (JP); Shiro Monzaki, Mishima (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/317,089

(22) Filed: Dec. 12, 2002

(65) Prior Publication Data

US 2003/0125864 A1 Jul. 3, 2003

(30) Foreign Application Priority Data

Dec. 12, 2001 (JP) ........................................ 2001-379165

(51) Int. Cl.[7] .............................. G05D 1/00; G06F 7/00; G06F 19/00
(52) U.S. Cl. .............................. 701/84; 701/72; 701/73; 701/80; 280/5.51; 73/492; 303/122.01; 303/141
(58) Field of Search .............................. 701/84, 72, 73, 701/70, 1, 80; 280/5.508, 5.51; 73/488, 492, 489; 303/121, 122.01, 139, 141, 140

(56) References Cited

U.S. PATENT DOCUMENTS

| 5,747,683 | A | * | 5/1998 | Gerum et al. | ............... | 73/118.1 |
| 5,862,503 | A | * | 1/1999 | Eckert et al. | ................. | 701/78 |
| 6,219,609 | B1 | * | 4/2001 | Matsuno et al. | ............... | 701/72 |
| 6,226,587 | B1 | * | 5/2001 | Tachihata et al. | .............. | 701/72 |
| 6,253,123 | B1 | * | 6/2001 | Schramm et al. | ............... | 701/1 |
| 6,259,973 | B1 | * | 7/2001 | Ehret et al. | ..................... | 701/1 |
| 6,305,760 | B1 | * | 10/2001 | Otake | ..................... | 303/122.05 |
| 6,600,974 | B1 | * | 7/2003 | Traechtler | ...................... | 701/1 |
| 2002/0045981 | A1 | * | 4/2002 | Ichikawa et al. | ............. | 701/91 |

FOREIGN PATENT DOCUMENTS

| JP | 62-253559 A | 11/1987 |
| JP | 9-125999 A | 5/1997 |

* cited by examiner

Primary Examiner—Thomas G. Black
Assistant Examiner—Ronnie Mancho
(74) Attorney, Agent, or Firm—Burns, Doane, Swecker & Mathis, LLP

(57) ABSTRACT

A vehicle behavior control device includes a turning limit state detecting device for detecting a turning limit state of a vehicle and an engine output control device for performing a torque-down control by decreasing an engine output when the turning limit state of the vehicle is detected. The engine output control device includes a longitudinal acceleration detecting device, a lateral acceleration detecting device, a road friction coefficient estimating device, a maximum longitudinal acceleration calculating device for calculating a maximum longitudinal acceleration from the estimated road friction coefficient by the road friction coefficient estimating device and the lateral acceleration detected by the lateral acceleration estimating device, and a margin calculating device for calculating a margin of the longitudinal acceleration of the vehicle as a deviation between the maximum longitudinal acceleration calculated by the maximum longitudinal acceleration calculating device and the longitudinal acceleration detected by the longitudinal acceleration detecting device.

4 Claims, 9 Drawing Sheets

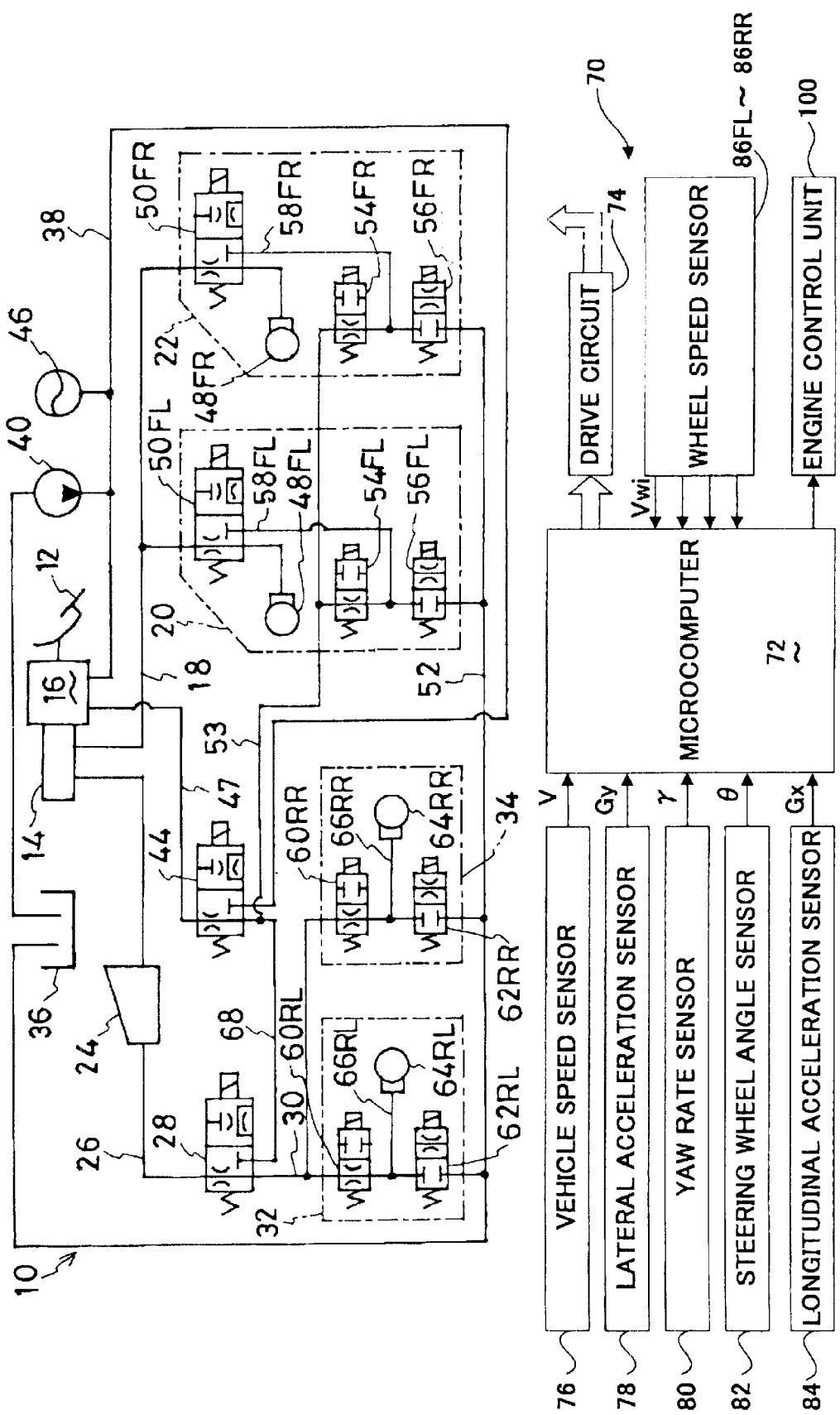

VEHICLE BEHAVIOR CONTROL DEVICE

This application is based on and claims priority under 35 U.S.C. §119 with respect to Japanese Application No. 2001-379165 filed on Dec. 12, 2001 the entire content of which is incorporated herein by reference.

FIELD OF THE INVENTION

This invention generally relates to a vehicle behavior control device for decreasing a spin state and a drift-out state during turning of a vehicle. More particularly, the present invention pertains to a vehicle behavior control device for stabilizing a turning behavior of the vehicle by decreasing an engine output.

BACKGROUND OF THE INVENTION

A known vehicle behavior control device for controlling a turning behavior of a vehicle is disclosed in Japanese Patent Laid-Open Publication No. S62-253559. In the disclosed device, a turning limit of the vehicle is determined if $\mu$-S characteristics between a road surface and tires are in a nonlinear region. The turning behavior of the vehicle is stabilized by decreasing a vehicle speed by reducing an engine output or applying a braking force.

According to the disclosed device, an undesirable vehicle behavior such as a spin state and a drift-out state can be restrained since the vehicle speed is automatically decreased when the vehicle is under a turning limit condition. The turning behavior is thus more stabilized compared to a case where the braking force or the engine output is not controlled.

In the aforementioned device, the engine output returns to a level in response to a depressing amount of an accelerator pedal when the turning behavior of the vehicle is stabilized and the $\mu$-S characteristics between the road surface and the tires are back to the linear region. However, if an amount of the engine output increase at a recovery stage of the engine output, i.e. an amount of a driving force increase, is not appropriately controlled, a driver may feel weakness in a driving force especially when a road friction coefficient is high. In addition, the vehicle behavior may be unstable when the road friction coefficient is low.

In order to solve such a problem mentioned above, in Japanese Patent Laid-Open Publication No. H09-125999, for example, firstly a horizontal acceleration Gxy is evaluated as the square root of a sum of the square of a longitudinal acceleration Gx of the vehicle and the square of a lateral acceleration Gy of the vehicle. Next, a margin of the horizontal acceleration of the vehicle is calculated as a difference between the horizontal acceleration Gxy and an estimated road friction coefficient $\mu$g. The larger the margin of the horizontal acceleration is, the more a gradient of the engine output increase is at the recovery stage of the engine output. When the estimated road friction coefficient $\mu$g is high and thus the margin is large, the driver is prevented from feeling weakness in the driving force since the engine output is controlled to be larger. Additionally, when the estimated road friction coefficient $\mu$g is low and thus the margin is small, the vehicle behavior is prevented from being unstable since the engine output is controlled not to be excessive.

According to the device disclosed in Japanese Patent Laid-Open Publication H09-125999, however, the margin for determining the gradient of the engine output increase at the recovery stage of the engine output is calculated smaller than a maximum margin of the longitudinal acceleration of the vehicle being calculated in consideration of a maximum longitudinal acceleration of the vehicle at the time from a relationship between a road friction coefficient $\mu$ and the lateral acceleration Gy affecting to the vehicle at the time.

A detail of the aforementioned status is explained referring to FIG. 15. The square root of a sum of the square of a longitudinal direction element and the square of a lateral direction element of the road friction applied to the tiers of the vehicle is generally equal to or smaller than a value corresponding to the road friction coefficient $\mu$. A value of the longitudinal direction element of the road friction corresponds to the longitudinal acceleration of the vehicle, and a value of the lateral direction element of the road friction corresponds to the lateral acceleration of the vehicle. Thus, the square root of a sum of the square of the longitudinal acceleration of the vehicle and the square of the lateral acceleration of the vehicle is equal to or smaller than the value corresponding to the road friction coefficient $\mu$.

In FIG. 15, a quarter circle (friction circle) with a radius of the value corresponding to the road friction coefficient $\mu$ is provided for diagrammatically showing the above explanation. If it is assumed that the longitudinal acceleration Gx of the vehicle and the lateral acceleration Gy of the vehicle exist, the maximum longitudinal acceleration Gxmax of the vehicle is evaluated as a value indicated in FIG. 15 (the square root of a value calculated by subtracting the square of the lateral acceleration Gy from the square of the road friction coefficient $\mu$) from a relationship between the road friction coefficient $\mu$ and the lateral acceleration Gy. A maximum margin Kmax of the longitudinal acceleration of the vehicle at the time is set as a value (Gxmax−Gx) indicated in FIG. 15.

Whereas, a margin K of the acceleration calculated by the vehicle behavior control device disclosed in the Publication No. H09-125999 is a value ($\mu$-Gxy) indicated in FIG. 15. It is easily understood by a geometric relation of an arc that the maximum margin Kmax of the longitudinal acceleration of the vehicle is always equal to or greater than the margin K calculated by the device disclosed in the Publication H09-125999.

According to the above disclosed vehicle behavior control device, therefore, the margin is calculated smaller even when the margin can be calculated lager, the gradient of the engine output increase can be larger, and thus the longitudinal acceleration can be larger. Then, the possible longitudinal acceleration is limited and the weakness in the driving force that the driver feels is not prevented.

Thus, a need exists for the vehicle behavior control device which addresses at least the foregoing drawback associated with other known vehicle behavior control devices.

SUMMARY OF THE INVENTION

It is an object of the present invention to provide a vehicle behavior control device which can prevent an unstable vehicle behavior and decrease weakness in the driving force that a driver feels by appropriately controlling an engine output increase when a turning behavior of the vehicle becomes stable and thus the engine output recovers to a level corresponding to a depression amount of an accelerator pedal.

According to an aspect of the present invention, a vehicle behavior control device includes a turning limit state detecting means for detecting a turning limit state of a vehicle, and an engine output control means for performing a torque-down control by decreasing an engine output when the turning limit state of the vehicle is detected. The engine output control means includes a longitudinal acceleration detecting means for detecting a longitudinal acceleration in a substantially longitudinal direction of the vehicle, a lateral acceleration detecting means for detecting a lateral acceleration in a substantially lateral direction of the vehicle, a road friction coefficient estimating means for estimating a road friction coefficient, a maximum longitudinal acceleration calculating means for calculating a maximum longitudinal acceleration as a maximum value of the longitudinal acceleration currently existing from the estimated road friction coefficient by the road friction coefficient estimating means and the lateral acceleration detected by the lateral acceleration estimating means, and a margin calculating means for calculating a margin of the longitudinal acceleration of the vehicle as a deviation between the maximum longitudinal acceleration calculated by the maximum longitudinal acceleration calculating means and the longitudinal acceleration detected by the longitudinal acceleration detecting means. A gradient of an engine output increase is controlled in response to the margin of the longitudinal acceleration of the vehicle calculated by the margin calculating means at a recovery stage of the engine output for reducing the engine output decrease amount during the torque-down control.

The maximum longitudinal acceleration calculating means calculates the maximum longitudinal acceleration by evaluating a square root of a value calculated by subtracting a square of the lateral acceleration value from a square of the estimated road friction coefficient.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein:

FIG. 12 is a graph showing a relationship among engine revolutions Ne, a main throttle opening angle $\phi m$, and an engine output Tall;

FIG. 13 is a graph showing a relationship among the engine revolutions Ne, a target torque Treq of the engine, and a sub-throttle opening angle $\phi s$;

FIG. 14 is a graph showing a relationship between a margin Gmgn of a horizontal acceleration Gxy and a torque-up limit Tuplim;

DETAILED DESCRIPTION OF THE INVENTION

Figure 1:
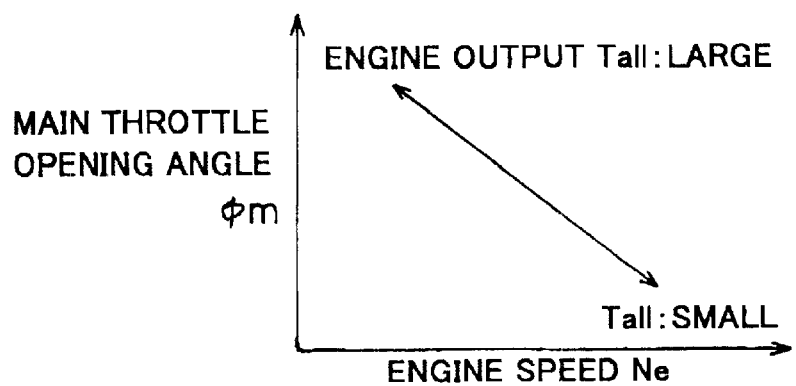
FIG. 1 is a schematic structural view of a hydraulic circuit and an electric control unit of a vehicle behavior control device according to an embodiment of the present invention.
Figure 1:
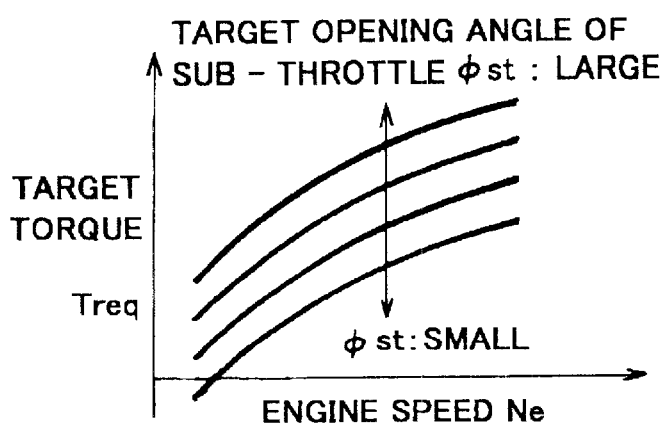
Figure 1:
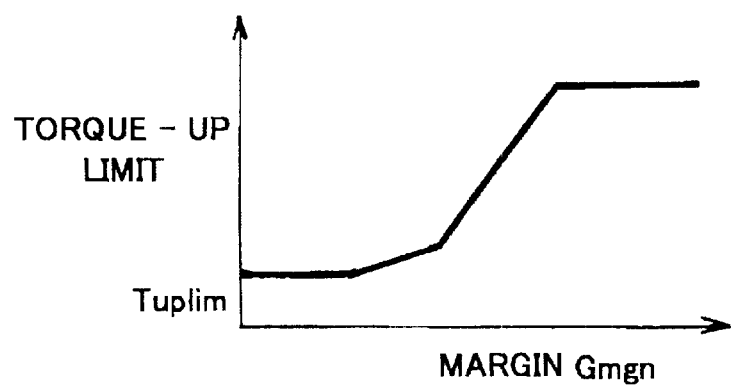
Figure 15:
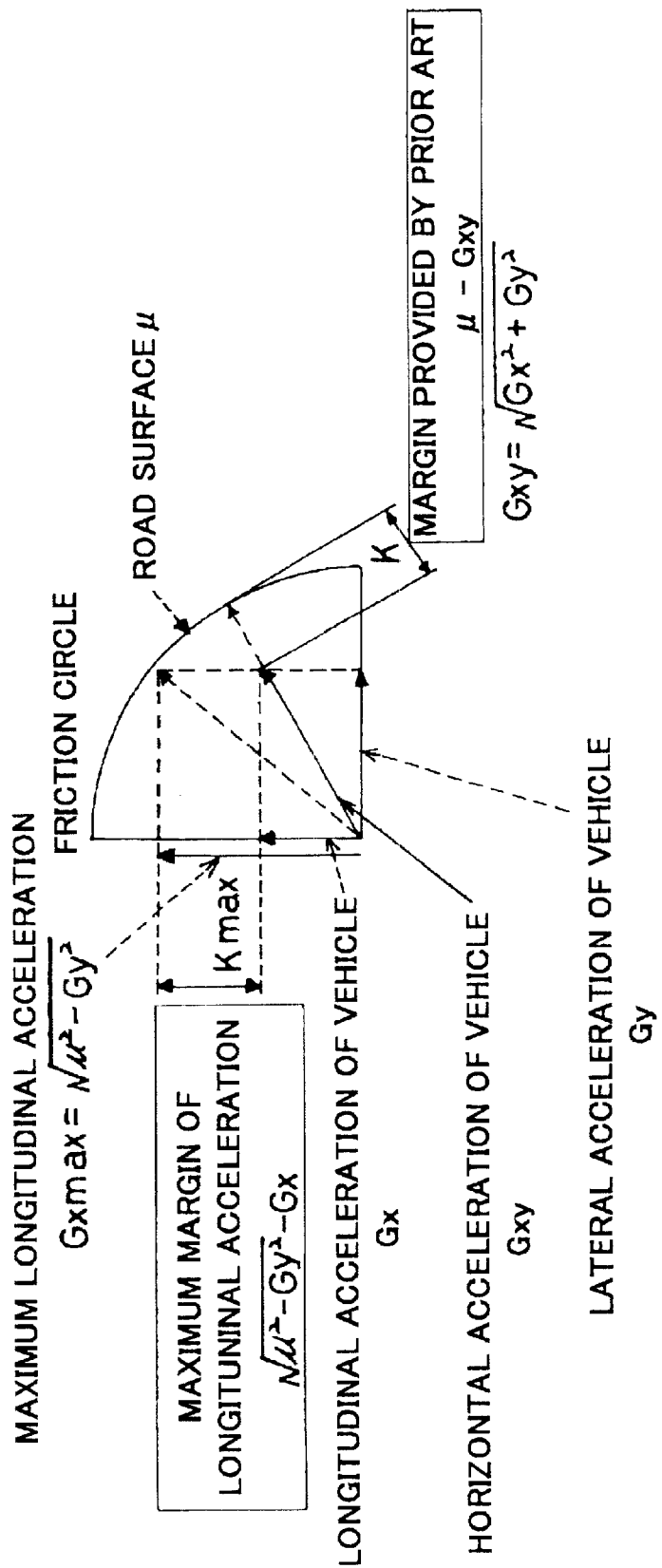
FIG. 15 is a comparison view between the present invention and a prior art about a calculation of a margin of an acceleration affecting to the vehicle with reference to a road friction coefficient $\mu$.

An embodiment of the present invention is explained referring to drawings. FIG. 1 is a schematic structural view showing a hydraulic circuit and an electric control unit of a vehicle behavior control device according to the embodiment of the present invention.

In FIG. 1, a braking system 10 includes a master cylinder 14 for pressurizing and delivering a brake oil through a first port and a second port in response to a depression of a brake pedal 12 and a hydraulic booster 16 for increasing a pressure of the brake oil to a pressure level corresponding to an oil pressure in the master cylinder (regulator pressure). The first port of the master cylinder 14 is connected to brake oil pressure control units 20, 22 for front left and right wheels via a brake oil pressure control tube 18 for the front wheels. The second port of the master cylinder 14 is connected to a solenoid-operated control valve 28 of a 3-port 2-position switching type for rear left and right wheels via a brake oil pressure control tube 26 for the rear wheels equipped with a proportional valve 24 midway. The control valve 28 is connected to a brake oil pressure control unit 32 for the rear left wheel and a brake oil pressure control unit 34 for the rear right wheel via a tube 30.

The braking system 10 also includes an oil pump 40 to pump up the brake oil reserved in a reservoir 36 and supply the brake oil, which has been highly pressurized, to a high-pressure tube 38. The high-pressure tube 38 is connected to the hydraulic booster 16 and also to a switching valve 44. Further, an accumulator 46 is connected to a midpoint of the high-pressure tube 38 for accumulating and pressurizing the high-pressure oil discharged from the oil pump 40 at an accumulator pressure. The switching valve 44 is also of the solenoid-operated 3-port 2-position switching type as shown in FIG. 1 and is connected to the hydraulic booster 16 via a regulator pressure supply tube 47 for the four wheels.

The brake oil pressure control units 20, 22 for the front left and right wheels include wheel cylinders 48FL, 48FR respectively for controlling the braking force at the corresponding wheels respectively and solenoid-operated control valves 50FL, 50FR respectively of a 3-port 2-position switching type. The brake oil pressure control units 20, 22 also include normally opened, solenoid-operated open/closed valves 54FL, 54FR respectively and normally closed, solenoid-operated open/closed valves 56FL, 56 FR respectively provided at the midpoint of a regulator pressure supply tube 53 for the front left and right wheels connected between a low-pressure tube 52 as a return passage connected to the reservoir 36 and the switching valve 44. The regulator pressure supply tube 53 for the front left and right wheels provided between the open/closed valves 54FL, 54FR and the open/closed valves 56FL, 56FR respectively in each unit is connected to the control valves 50FL, 50FR via connecting tubes 58FL, 58FR respectively.

The brake oil pressure control units 32, 34 for the rear left and right wheels include normally opened, solenoid-operated open/closed valves 60RL, 60RR respectively and normally closed, solenoid-operated open/closed valves 62RL, 62RR respectively provided at the midpoint of the tube 30 between the control valve 28 and the low-pressure tube 52, and wheel cylinders 64RL, 64RR respectively for controlling the braking force at the corresponding wheels thereto. The wheel cylinders 64RL, 64RR are connected to the tube 30 provided between the open/closed valves 60RL, 60RR and the open/closed valves 62RL, 62RR respectively in each unit via connecting tubes 66RL, 66RR respectively.

Each control valve 50FL or 50FR is arranged to switch between a first position as shown in FIG. 1 at which the brake oil pressure control tube 18 for the front wheels is connected to the wheel cylinder 48FL or 48FR and also the wheel cylinder 48FL or 48FR is prohibited to be connected to the connecting tube 58FL or 58FR, and a second position at which the brake oil pressure control tube 18 is prohibited to be connected to the wheel cylinder 48FL or 48FR and also the wheel cylinder 48FL or 48FR is connected to the connecting tube 58FL or 58FR.

A regulator pressure supply tube 68 for the rear left and right wheels is connected between the switching valve 44 and the control valve 28 for the rear left and right wheels. The control valve 28 is arranged to switch between a first position at which the brake oil pressure control tube 26 for the rear wheels is connected to the open/closed valves 60RL, 60RR and also the open/closed valves 60RL, 60RR are prohibited to be connected to the regulator pressure supply tube 68, and a second position at which the brake oil pressure control tube 26 is prohibited to be connected to the open/closed valves 60RL, 60RR and also the open/closed valves 60RL, 60RR are connected to the regulator pressure supply tube 68.

The control valves 50FL, 50FR and 28 function as a cut-off valve of the master cylinder pressure. When the control valves 50FL, 50FR and 28 are set at the first position, the wheel cylinders 48FL, 48FR and the wheel cylinders 64RL, 64RR are connected to the brake oil pressure control tubes 18, 26 respectively so that the master cylinder pressure is supplied to each wheel cylinder. Accordingly, the braking force at each wheel is controlled in response to the depressing amount of the brake pedal 12 actuated by a driver. When the control valves 50FL, 50FR and 28 are set at the second position, each wheel cylinder is prohibited to be supplied with the master cylinder pressure.

The switching valve 44 switches the oil pressure supplied to the wheel cylinders 48FL, 48FR, 64RL, 64RR between the accumulator pressure and the regulator pressure. When the control valves 50FL, 50FR, 28 are switched to the second position and the switching valve 44 is set at the first position under the condition that the open/closed valves 54FL, 54FR, 60RL, 60RR and the open/closed valves 56FL, 56FR, 62RL, 62RR are positioned as shown in FIG. 1, the regulator pressure is supplied to the wheel cylinders 48FL, 48FR, 64RL, 64RR so that the pressure in each wheel cylinder is controlled at the regulator pressure. The braking force at any one of the wheels is controlled in a boosting mode with the regulator pressure in response to the depressing amount of the brake pedal 12 regardless of the braking force at the other wheels.

However, even if each valve is switched to be the boosting mode with the regulator pressure, the brake oil in the wheel cylinder flows back and the braking pressure is actually decreased regardless of the boosting mode of controlling in case that the pressure in the wheel cylinder is higher than the regulator pressure.

When the control valves 50FL, 50FR, 28 are switched to the second position and also the switching valve 44 is switched to the second position under the condition that the open/closed valves 54FL, 54FR, 60RL, 60RR and the open/closed valves 56FL, 66FR, 62RL, 62 RR are positioned as shown in FIG. 1, the accumulator pressures is supplied to the wheel cylinders 48FL, 48FR, 64RL, 64RR so that the pressure in each wheel is controlled at the accumulator pressure, which is higher than the regulator pressure. The braking pressure at any one of the wheels is controlled in the boosting mode with the accumulator pressure regardless of the depressing amount of the brake pedal 12 or the braking pressure at the other wheels.

Further, when the open/closed valves 54FL, 54FR, 60RL, 60RR are switched to the second position under the condition that the control valves 50FL, 50FR, 28 are switched to the second position and also the open/closed valves 56FL, 56FR, 62RL, 62RR are controlled in a state in FIG. 1, the pressure in each wheel cylinder is maintained as it is regardless of the position of the switching valve 44. Furthermore, when the open/closed valves 54FL, 54FR, 60RL, 60 RR and the open/closed valves 56FL, 56FR, 62RL, 62RR are switched to the second position under the condition that the control valves 50FL, 50FR, 28 are switched to the second position, the pressure in each wheel cylinder is reduced regardless of the position of the switching valve 44. The braking pressure at any one of the wheels is controlled in a decompression mode regardless of the depressing amount of the brake pedal 12 or the braking pressure at the other wheels.

The switching valve 44, the control valves 50FL, 50FR, 28, the open/closed valves 54FL, 54FR, 60RL, 60RR and the open/closed valves 56FL, 56FR, 62RL, 62RR are controlled by an electric control unit 70 as being explained later. The electric control unit 70 includes a microcomputer 72 and a drive circuit 74. The microcomputer 72 is not shown in detail in FIG. 1 but may have a known structure including, for example, a central processing unit (CPU), a read only memory (ROM), a random access memory (RAM), an input/output port device connected each other via a bi-directional common bus.

The input/output port device of the microcomputer 72 receives signals representing a vehicle speed V from a vehicle speed sensor 76, a lateral acceleration Gy of the vehicle from a lateral acceleration sensor 78 substantially provided at a center of gravity of the vehicle, a yaw rate $\gamma$ of the vehicle from a yaw rate sensor 80, a steering wheel angle $\theta$ from a steering wheel angle sensor 82, a longitudinal acceleration Gx of the vehicle from a longitudinal acceleration sensor 84 substantially provided at the center of gravity of the vehicle, and wheel speeds (peripheral velocity) of the front left and right wheels and the rear left and right wheels Vwfl, Vwfr, Vwrl, Vwrr from wheel speed sensors 86FL, 86FR, 86RL, and 86RR. The sensors such as the lateral acceleration sensor 78 and the yaw rate sensor 80 are arranged to detect the lateral acceleration and other factors, the positive direction of which is defined along the left turning direction of the vehicle. The longitudinal acceleration sensor 84 is arranged to detect the longitudinal acceleration, the positive direction of which is defined along the acceleration direction of the vehicle.

Figure 8:
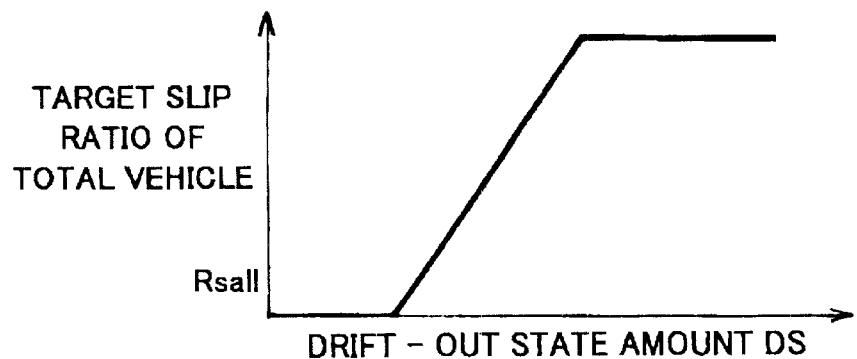
FIG. 8 is a graph showing a relationship between a drift-out state amount DS and a target slip ratio of a total vehicle Rsall.
Figure 9:
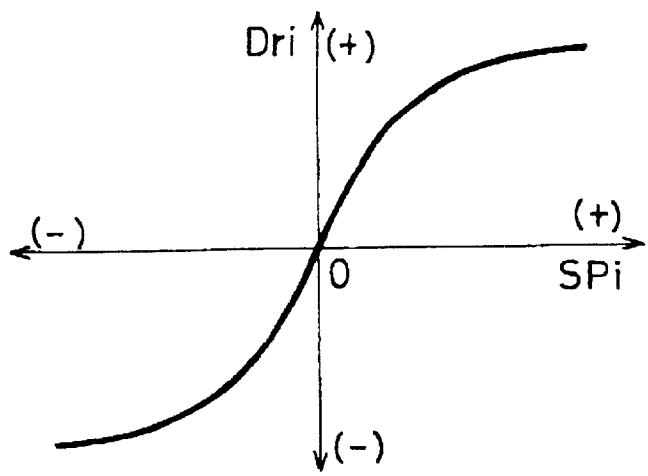
FIG. 9 is a graph showing a relationship between a target slip amount SPi of each wheel and a duty ratio Dri.
Figure 10:
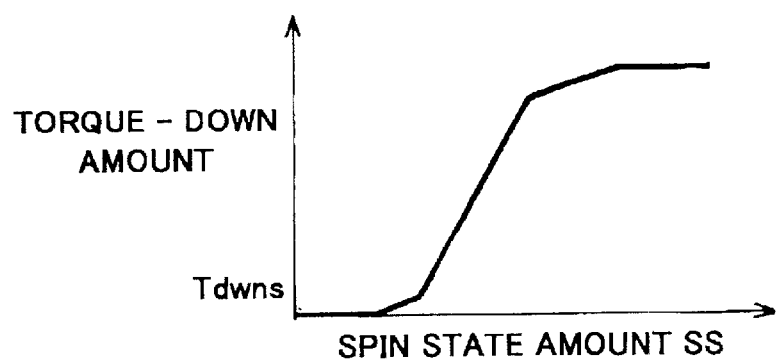
FIG. 10 is a graph showing a relationship between the spin state amount SS and a torque-down amount Tdwns.
Figure 11:
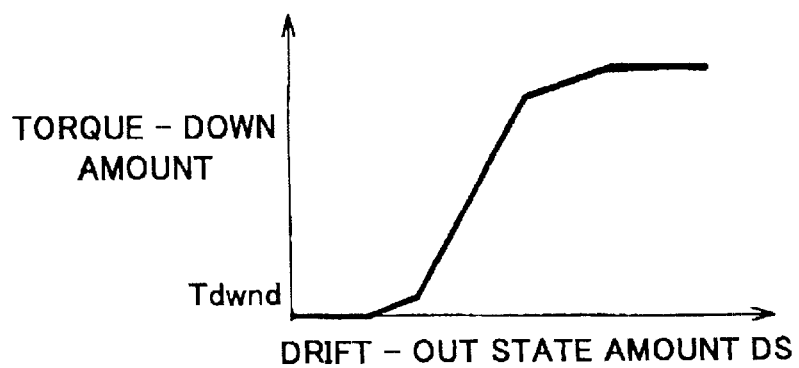
FIG. 11 is a graph showing a relationship between the drift-out state amount DS and a torque-down amount Tdwnd.

The microcomputer 72 stores a control flow in FIGS. 2, 3 and maps in FIGS. 7–9 as mentioned later. The CPU performs various calculations to be mentioned later based on parameters detected by aforementioned various sensors, calculates a spin state amount SS and a drift-out state amount DS for detecting the turning behavior of the vehicle, estimates the turning behavior of the vehicle based on the above state amounts, controls the turning behavior by controlling the braking force at each wheel based on the estimated result, and outputs a signal indicating the spin state amount SS and the drift-out state amount DS to an engine control unit 100.

Figure 6:
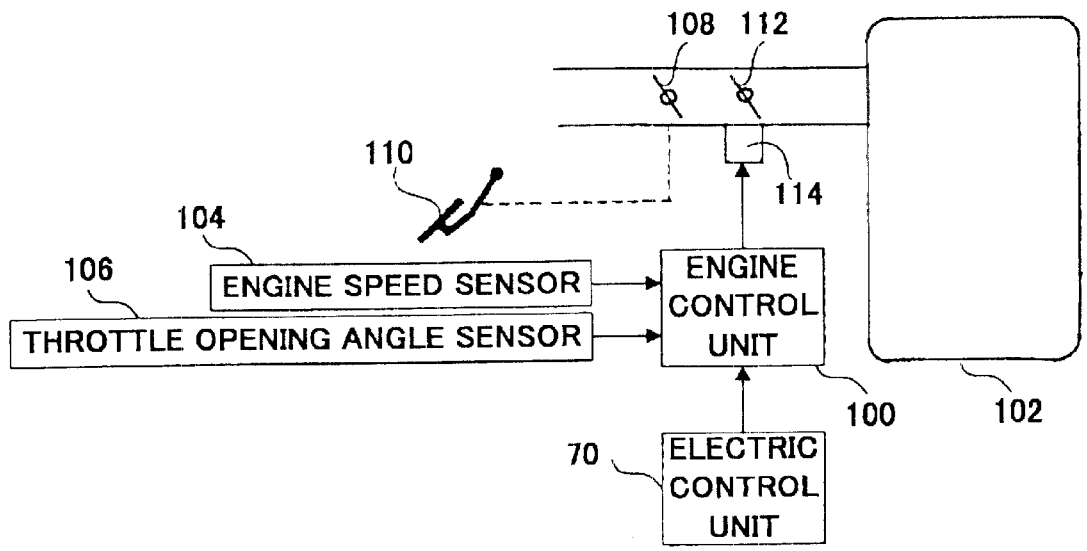
FIG. 6 is an explanatory view showing an intake system of an engine.

As shown in FIG. 6, the engine control unit 100 receives a signal representing an engine speed Ne from an engine speed sensor 104 of an engine 102, and a signal representing an opening angle $\phi m$ of a main throttle 108 from a throttle opening angle sensor 106. The main throttle 108 is driven by a depression of an accelerator pedal 110. A sub-throttle 112, which is driven by an actuator 114, is provided close to the main throttle 108.

Figure 4:
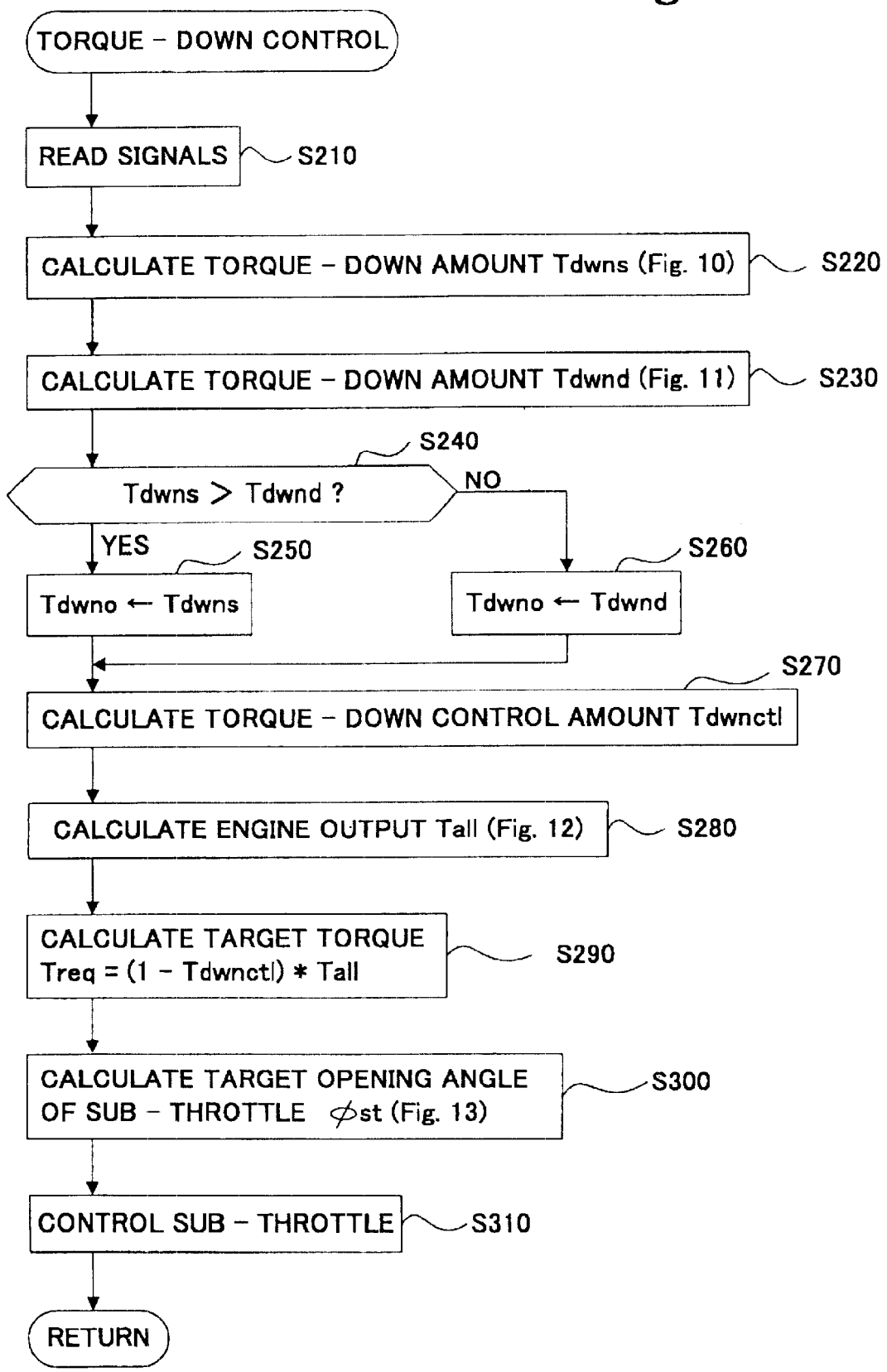
FIG. 4 is a flowchart showing a routine of a torque-down control according to the embodiment of the present invention.
Figure 5:
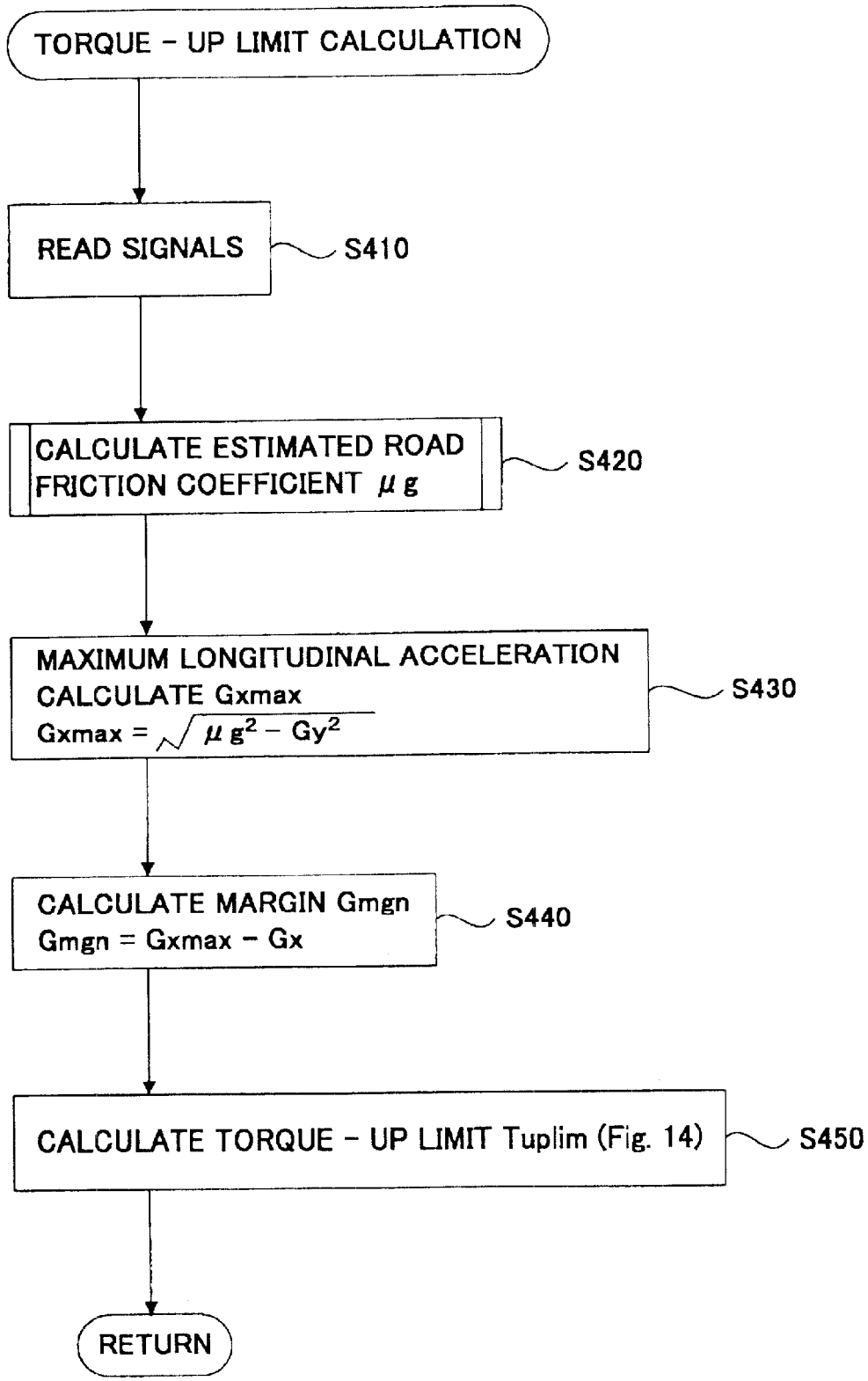
FIG. 5 is a flowchart showing a routine of a torque-up limit calculation according to the embodiment of the present invention.

The engine control unit 100 calculates a target torque Treq of the engine based on the spin state amount SS and the drift-out state amount DS according to the control flow in FIGS. 4, 5 and the maps in FIGS. 10–14, calculates a target opening angle $\phi st$ of the sub-throttle 112 based on the target torque Treq, and outputs a control signal to the actuator 114 so that the opening angle of the sub-throttle 112 becomes equal to the target opening angle $\phi st$. The engine output can be increased or decreased accordingly.

Figure 2:
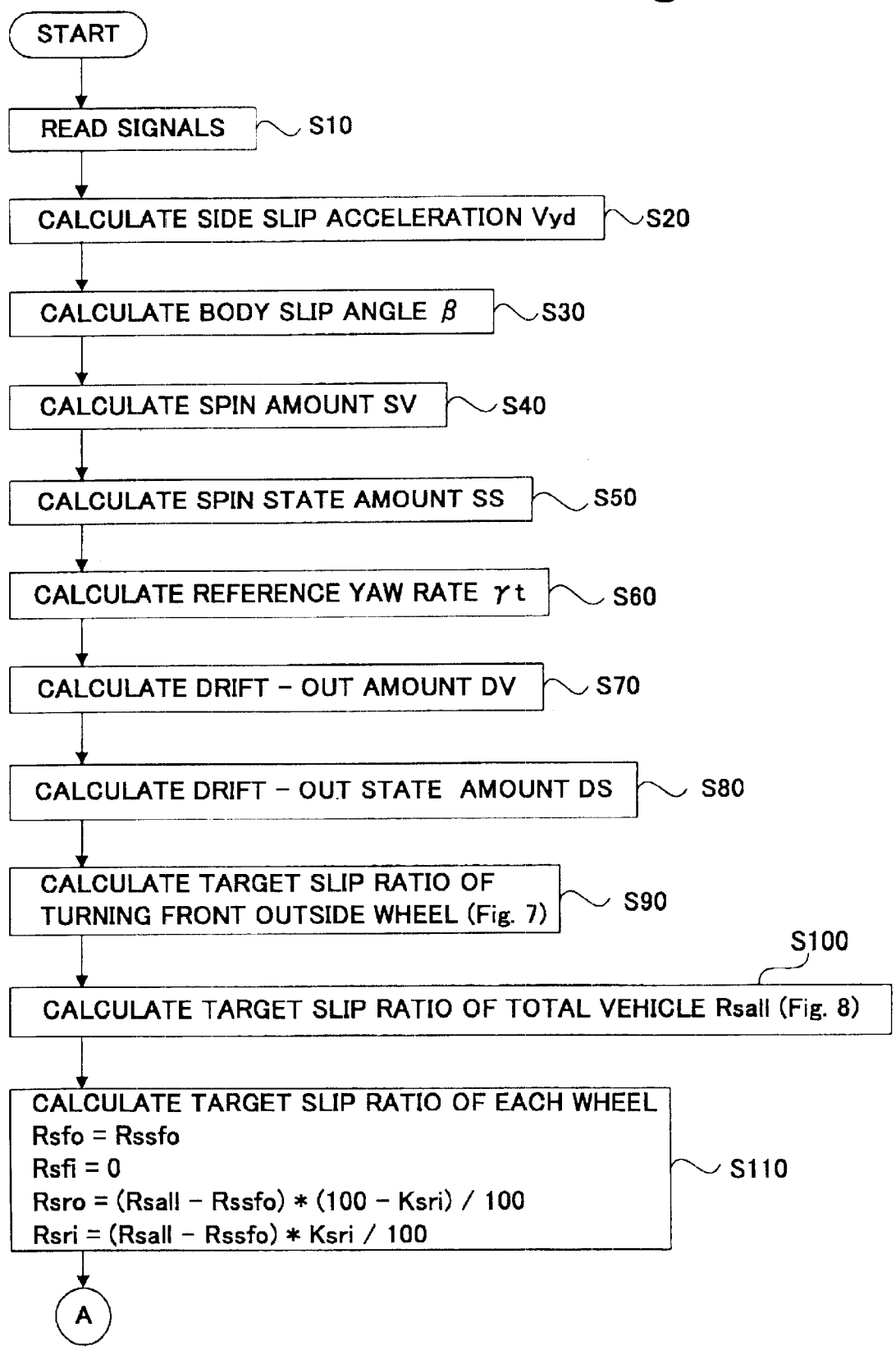
FIG. 2 is a flowchart showing a first half routine of the vehicle behavior control according to the embodiment of the present invention.
Figure 3:
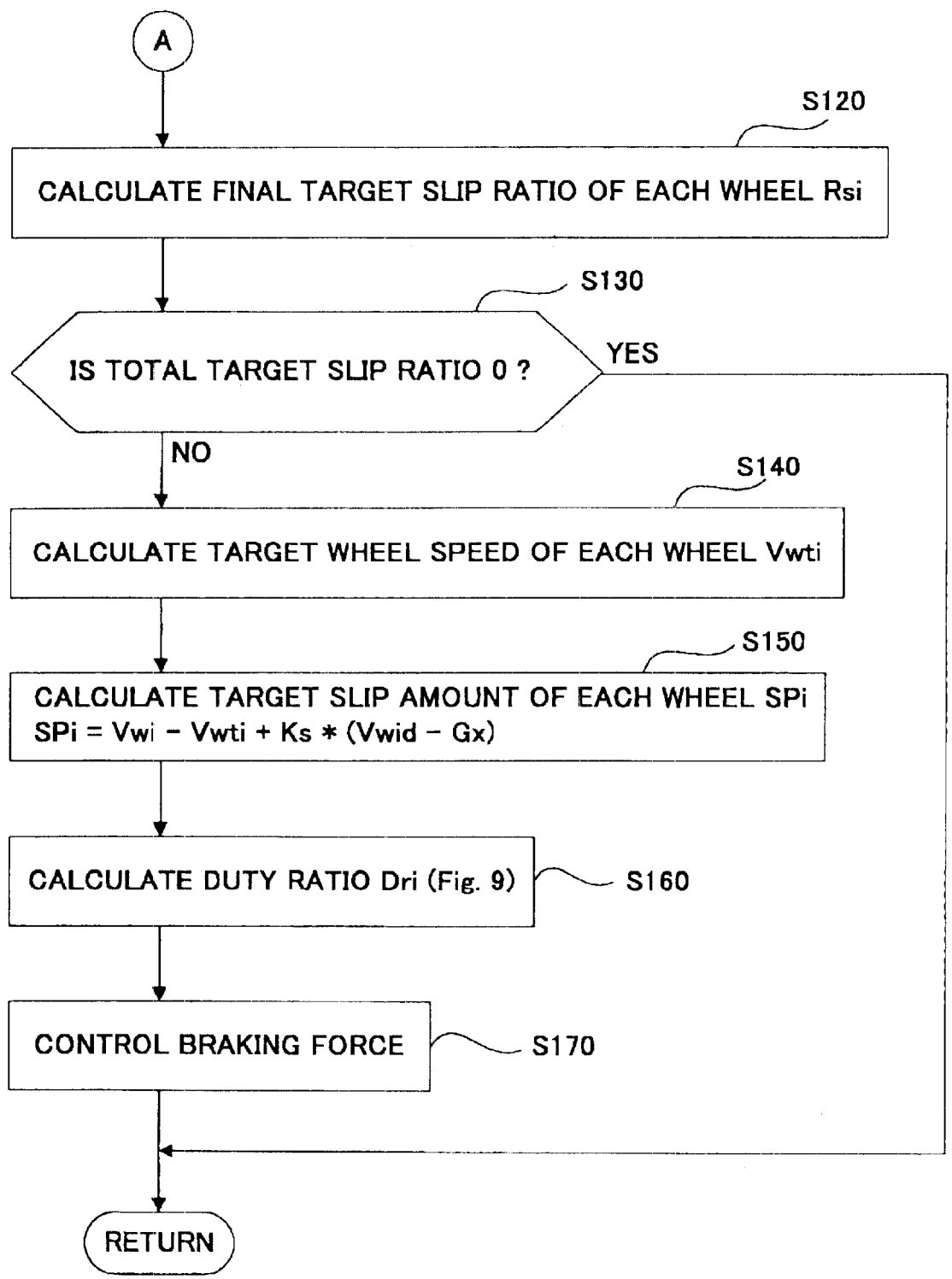
FIG. 3 is a flowchart showing a last half routine of the vehicle behavior control according to the embodiment of the present invention.

The vehicle behavior control routine is explained referring to the flowchart in FIGS. 2,3. The flowchart shown in FIGS. 2,3 is started with on of an ignition switch not shown and is carried out repeatedly at predetermined time intervals.

First, the sensor signals representing such as the vehicle speed V detected by the vehicle speed sensor 76 are read at step (which will be represented by "S") 10. At next S20, deviation of the lateral acceleration, i.e. a side slip acceleration of the vehicle, Vyd is calculated as a difference, Gy–V·γ, between the lateral acceleration Gy and the product V·γ of the vehicle speed V and the yaw rate γ. At S30, a side slip velocity Vy of the vehicle is first calculated by integrating the side slip acceleration Vyd. A vehicle body slip angle β is then calculated as a ratio Vy/vx of the side slip velocity Vy of the vehicle to the longitudinal speed Vx (=vehicle speed V) of the vehicle.

At S40, a spin amount SV is calculated as a linear sum K1·β+K2·Vyd of the vehicle body slip angle β and the side slip acceleration Vyd, where K1 and K2 are positive constants. At S50, a turning direction is determined based on a sign of the yaw rate γ. That is, the spin state amount SS is evaluated as SV when the vehicle is turning left, and as –SV when the vehicle is turning right. When a calculated result is a negative value, the spin state amount is determined to be 0. The spin amount SV may be calculated as a linear sum of the vehicle body slip angle β and a differentiation value βd thereof At S60, a target yaw rate γc is calculated according to Formula 1 below, where Kh is a stability factor and also a reference yaw rate γt is calculated according to Formula 2 below, where T is a time constant and s is a Laplacian. The target yaw rate γc may be calculated by adding the lateral acceleration Gy of the vehicle in consideration of a dynamic yaw rate.

$$\gamma c = V \cdot \theta / (1 + Kh \cdot V2) \cdot H \quad \text{(Formula 1)}$$

$$\gamma t = \gamma c / (1 + T \cdot s) \quad \text{(Formula 2)}$$

At S70, a drift-out amount DV is calculated according to Formula 3 below. The drift-out amount DV may be calculated according to Formula 4 below, where H is a wheel base.

$$DV = (\gamma t - \gamma) \quad \text{(Formula 3)}$$

$$DV = H \cdot (\gamma t - \gamma) / V \quad \text{(Formula 4)}$$

At S80, the turning direction of the vehicle is determined based on the sign of the yaw rate γ. That is, the drift-out state amount DS is evaluated as DV when the vehicle is turning left, and as –DV when the vehicle is turning right. When the calculated result is a negative value, the drift-out state amount is determined to be 0.

Figure 7:
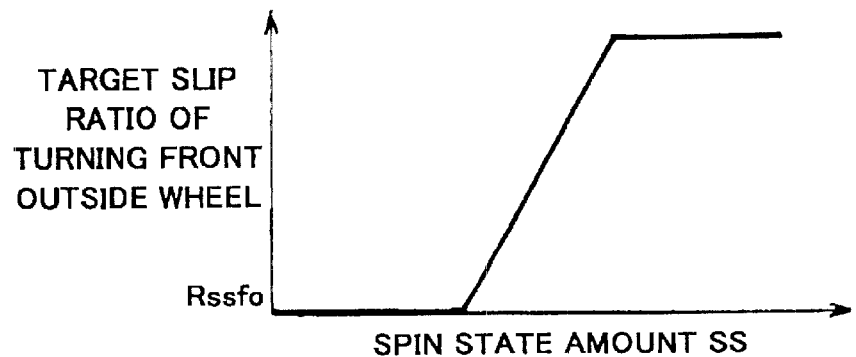
FIG. 7 is a graph showing a relationship between a spin state amount SS and a target slip ratio of turning front outside wheels Rssfo.

At S90, a target slip ratio of a turning front outside wheel Rssfo is calculated according to a map corresponding to a graph shown in FIG. 7 based on the spin state amount SS. At S100, a target slip ratio of a total vehicle Rsall is calculated according to a map corresponding to a graph shown in FIG. 8 based on the drift-out state amount DS.

At S110, target slip ratios of a turning front outside wheel Rsfo, a turning front inside wheel Rsfi, a turning rear outside wheel Rsro, and a turning rear inside wheel Rsri are calculated according to Formula 5, where Ksri is a distribution ratio for the turning rear inside wheel.

$$Rsfo = Rssfo$$

$$Rsfi = 0$$

$$Rsro = (Rsall - Rssfo) \cdot (100 - Ksri)/100$$

$$Rsri = (Rsall - Rssfo) \cdot Ksri/100 \quad \text{(Formula 5)}$$

At S120, the turning outside wheels and inside wheels are determined according to the determination of the turning direction of the vehicle based on the sign of the yaw rate γ. A final target slip ratio Rsi (i=fr, fl, rr, and rl) of each wheel is then determined based on the determination result. That is, the final target slip ratio Rsi in the turning right state or in the turning left state is evaluated according to Formula 6 or Formula 7.

$$Rsfr = Rsfo$$

$$Rsfl = Rsfi$$

$$Rsrr = Rsro$$

$$Rsrl = Rsri \quad \text{(Formula 6)}$$

$$Rsfr = Rsfi$$

$$Rsfl = Rsfo$$

$$Rsrr = Rsri$$

$$Rsrl = Rsro \quad \text{(Formula 7)}$$

At S130, it is determined whether the total final target slip ratio Rsi is 0 or not, i.e., it is determined whether the vehicle behavior control is required or not. If a positive judgment is obtained, the operation returns to S10. If a negative judgment is obtained, the operation proceeds to S140 where a target wheel speed Vwti of each wheel is calculated according to Formula. 8 below, where Vb is a reference wheel speed (wheel speed of the turning front inside wheel, for example).

$$Vwti = Vb \cdot (100 - Rsi)/100 \quad \text{(Formula 8)}$$

At S150, a target slip amount SPi of each wheel is calculated according to Formula 9 below, where Vwid is a wheel acceleration (differentiation value of Vwi) of each wheel and Ks is a predetermined positive coefficient. At S160, a duty ratio Dri of each wheel is calculated according to a map corresponding to a graph shown in FIG. 9.

$$SPi=Vwi-Vwti+Ks\cdot(Vwid-Gx) \quad \text{(Formula 9)}$$

At S170, the switching valve 44 is switched to the second position so that the accumulator pressure is supplied. At the same time, a control signal is outputted to the control valve 28, 50FR, or 50FL corresponding to the wheel which the final target slip ratio Rsi is not 0 and thus that valve is switched to the second position. In addition, a control signal corresponding to the duty ratio Dri is outputted to each open/closed valve of each wheel, thereby controlling the supply/stop of the accumulator pressure to the wheel cylinder 48FR, 48FL, 64RR, or 64RL. Accordingly, the braking pressure at each wheel is controlled.

In this case, when the duty ratio Dri is set between a negative reference value and a positive reference value, the upstream open/closed valve is switched to the second position and the downstream open/closed valve is held at the first position, thereby maintaining the pressure in the corresponding wheel cylinder. When the duty ratio Dir is not less than the positive reference value, the upstream and downstream open/closed valves are controlled to the positions shown in FIG. 1, to supply the accumulator pressure to the corresponding wheel cylinder, thereby increasing the pressure in this wheel cylinder. When the duty ratio Dir is not more than the negative reference value, the upstream and downstream open/closed valves are switched to the second position, to discharge the brake oil in the corresponding wheel cylinder to the low-pressure tube 52, thereby decreasing the pressure in this wheel cylinder.

When the pressure in the wheel cylinder is increased, the upstream open/closed valve is opened or closed in response to the duty ratio. Similarly, when the pressure in the wheel cylinder is decreased, the downstream open/closed valve is opened or closed in response to the duty ratio. The higher the duty ratio is, the lager an increase/decrease gradient of the pressure in the wheel cylinder becomes.

Next, a torque-down control routine according to the embodiment of the present invention is explained referring to a flowchart of FIG. 4. The control along the flowchart is carried out by interruption at predetermined time intervals.

At S210, signals representing such as the spin state amount SS are read in. At S220, a torque-down amount Tdwns based on the spin is calculated according to a map corresponding to a graph shown in FIG. 10 based on the spin state amount SS. At S230, a torque-down amount Tdwnd based on the drift-out is calculated according to a map corresponding to a graph shown in FIG. 11 based on the drift-out state amount DS.

At S240, it is determined whether Tdwns is greater than Tdwnd as a comparison between two torque-down amounts. When the positive judgment is obtained, the operation proceeds to S250 where a reference value of a torque-down control amount Tdwno is set to Tdwns. When the negative judgment is obtained, the operation proceeds to S260 where the reference value Tdwno is set to Tdwnd.

At S270, A torque-down control amount Tdwnctl is calculated according to Formula. 10 below, where MAX means to select either one of two values whichever larger in parenthesis, Tdwnctl (n−1) is the torque-down control amount of one cycle before, and Tuplim is a torque-up limit in FIG. 5 to be explained later.

$$Tdwnctl=\text{MAX}[0, \text{MAX}[Tdwnctl(n-1)-Tuplim, Tdwno]] \quad \text{(Formula 10)}$$

At S280, an engine output Tall is calculated according to a map corresponding to a graph shown in FIG. 12 based on the engine speed Ne and the main throttle opening angle φm. At S290, the target torque Treq is calculated according to Formula. 11 below. The engine output Tall may be calculated based on the engine speed Ne, the main throttle opening angle φm, and a deceleration ratio of a transmission.

$$Treq=(1-Tdwnctl)\cdot Tall \quad \text{(Formula 11)}$$

At S300, the target opening angle φst of the sub-throttle 112 is calculated according to a map corresponding to a graph shown in FIG. 13 based on the engine speed Ne and the target torque Treq. At S310, a control signal is outputted to the actuator 114 so that the opening angle of the sub-throttle 112 is equal to the target opening angle φst thereof, thereby controlling the increase/decrease of the engine output.

A torque-up limit Tuplim calculation routine according to the embodiment of the present invention is explained referring to a flowchart of FIG. 5. The control along the flowchart of FIG. 5 is carried out by interruption at predetermined time intervals.

At S410 of the routine, signals representing such as the longitudinal acceleration Gx are read in. At S420, an estimated road friction coefficient $\mu g$ is calculated by a known method.

At S430, a maximum longitudinal acceleration Gxmax, which is a maximum value of the longitudinal acceleration acting to the vehicle at the time, is calculated according to an equation shown in FIG. 5. At S440, a margin Gmgn of the longitudinal acceleration of the vehicle is calculated according to the equation in FIG. 5.

At S450, the torque-up limit Tuplim is calculated according to a map corresponding to a graph shown in FIG. 14 based on the margin Gmgn.

According to the embodiment of the present invention, when the turning behavior of the vehicle is in a stable state, the operation returns to S10 due to the positive judgment obtained at S130. The turning behavior control from S140 through S170 is not preformed and thus the braking pressure at each wheel is controlled in response to the depressing amount of the brake pedal 12 by the driver.

Further, when the turning behavior of the vehicle is in the stable state, the spin state amount SS and the drift-out state amount DS are 0 so that the torque-down amounts Tdwns, Tdwnd, which are calculated at S220, S230 respectively, and the torque-down control amount Tdwnctl are 0. In this case, the torque-down control of the engine is not performed (the target opening angle φst of the sub-throttle 112 becomes a maximum value).

Whereas, when the turning behavior of the vehicle is in an unstable state, the target wheel speed Vwti of each wheel is calculated at S140 due to the negative judgment obtained at S130. The braking force at each wheel is controlled from S150 through S170 so that the wheel speed of each wheel becomes equal to the target wheel speed Vwti. The turning behavior of the vehicle is then stabilized.

Specifically, the spin state amount is calculated based on such as the vehicle body slip angle β, and also the drift-out state amount is calculated based on such as the actual yaw rate γ. The braking force at each wheel is controlled based on both the spin state amount and the drift-out state amount, thereby reducing the unstable turning behavior in both the spin state and the drift-out state of the vehicle.

When the turning behavior of the vehicle is in the unstable state, the torque-down amounts Tdwns, Tdwnd are calculated at S220, S230 respectively, and then the torque-down control amount Tdwnctl is calculated from S240 through S270. The target opening angle φst of the sub-throttle 112 is calculated from S280 through S300 in response to the torque-down control amount so that the opening angle of the sub-throttle is controlled to be the target opening angle at S310. Accordingly, the torque-down control is performed whereby the spin state or the drift-out state of the vehicle can be reduced.

In the process of change from the unstable state to the stable state of the vehicle, the torque-down amounts Tdwns, Tdwnd calculated at S220, S230 respectively are gradually reduced, by which the torque-down control amount Tdwnctl is gradually decreased. Then, the sub-throttle opening angle is gradually increased, which results in a gradual recovery of the engine output.

According to the embodiment of the present invention shown in FIG. 5, especially, the longitudinal acceleration Gx and the lateral acceleration Gy of the vehicle are read in at S410, and then the estimated road friction coefficient $\mu g$ is calculated at S420. The maximum longitudinal acceleration Gxmax acting to the vehicle at the time is calculated at S430, and the margin Gmgn of the longitudinal acceleration of the vehicle is calculated by subtracting the longitudinal acceleration Gx from the maximum longitudinal acceleration Gxmax at S440. The torque-up control amount is calculated at S450 so that the larger the margin Gmgn is, the larger the torque-up control amount becomes. At S270 at a recovery stage of the engine output during the torque-down control, the torque-down control amount Tdwnctl at the time is calculated based on a value evaluated by subtracting the torque-up limit Tuplim from the torque-down control amount of one cycle before Tdwnctol (n−1). The engine output is controlled from S280 through 310 by using the calculated result obtained at S270. Thus, the larger the margin Gmgn of the longitudinal acceleration of the vehicle is at the recovery stage of the engine output during the torque-down control, the more the gradient of the engine output increases, by which the engine output is recovered in appropriate proportion.

At the recovery stage of the engine output during the torque-down control, the margin Gmgn is evaluated as a difference between the longitudinal acceleration Gx affecting to the vehicle at the time and the maximum longitudinal acceleration Gxmax, which is a maximum value of the longitudinal acceleration affecting to the vehicle at the time and is calculated from the estimated road friction coefficient $\mu g$ at the time and the lateral acceleration Gy acting to the vehicle at the time based on an idea of a friction circle. When the road friction coefficient is low and thus the margin is small, the engine output is controlled not to be excessive. Similarly, when the road friction coefficient is high and thus the margin is large, the engine output is controlled to be larger based on the maximum margin Gmgn of the longitudinal acceleration of the vehicle at the time. Accordingly, weakness in acceleration of the vehicle that the driver feels is more reduced when compared to a case of the known vehicle behavior device mentioned above.

According to the aforementioned embodiment, the braking force at each wheel is controlled by a feedback of the wheel speed. However, the braking force at each wheel can be controlled by a pressure feedback of the pressure in each wheel cylinder.

Further, according to the present embodiment, the drift-out state is determined from the drift-out state amount calculated based on the yaw rate difference. However, the drift-out state can be determined based on a difference between a reference steering wheel angle, which is evaluated from such as the actual yaw rate and the lateral acceleration, and an actual steering wheel angle.

According to the present invention mentioned above, the vehicle behavior is prevented from being unstable by appropriately controlling the engine output increase when the turning behavior of the vehicle becomes stable so that the engine output recovers to a level in response to the depressing amount of the accelerator pedal. The vehicle behavior control device for further decreasing the weakness in acceleration that the driver feels can be obtained accordingly.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

What is claimed is:

1. A vehicle behavior control device comprising:
   a turning limit state detecting means for detecting a turning limit state of a vehicle; and
   an engine output control means for performing a torque-down control by decreasing an engine output when the turning limit state of the vehicle is detected, the engine output control means including a longitudinal acceleration detecting means for detecting a longitudinal acceleration in a substantially longitudinal direction of the vehicle, a lateral acceleration detecting means for detecting a lateral acceleration in a substantially lateral direction of the vehicle, a road friction coefficient estimating means for estimating a road friction coefficient, a maximum longitudinal acceleration calculating means for calculating a maximum longitudinal acceleration as a maximum value of the longitudinal acceleration being generated from the estimated road friction coefficient by the road friction coefficient estimating means and the lateral acceleration detected by the lateral acceleration estimating means, and a margin calculating means for calculating a margin of the longitudinal acceleration of the vehicle as a deviation between the maximum longitudinal acceleration calculated by the maximum longitudinal acceleration calculating means and the longitudinal acceleration detected by the longitudinal acceleration detecting means;
   wherein a gradient of an engine output increase is controlled in response to the margin of the longitudinal acceleration of the vehicle calculated by the margin calculating means at a recovery stage of the engine output for reducing the engine output decrease amount during the torque-down control.

2. A vehicle behavior control device according to claim 1, wherein; the maximum longitudinal acceleration calculating means calculates the maximum longitudinal acceleration by evaluating a square root of a value calculated by subtracting a square of the lateral acceleration value from a square of the estimated road friction coefficient.

3. A vehicle behavior control device according to claim 1, wherein: the engine output control means further includes a torque-down amount detecting means for detecting a torque-down amount based on a spin state amount, a torque-down amount detecting means for detecting a torque-down amount based on a drift-out state amount, a comparison means for comparing the torque-down amounts based on the spin state amount and the drift-out state amount for determining whichever a larger amount as a reference value of a torque-down control amount, a torque-down control amount calculating means for calculating a torque-down control amount by using a torque-down amount of one cycle before and the reference value of the torque-down control amount, an engine output detecting means for detecting an engine output based on an engine speed and a main throttle opening angle, a target torque calculating means for calculating a target torque by using the torque-down control amount and the engine output, a target opening angle of a sub-throttle detecting means for detecting a target opening angle of the sub-throttle based on the engine speed and the target torque, wherein the engine output is increased or decreased so that the opening angle of the sub-throttle reaches substantially equal to the target opening angle thereof.

4. A vehicle behavior control device according to claim 1, wherein: the turning limit state detecting means includes a side slip acceleration detecting means for detecting a slide slip acceleration of the vehicle as a deviation of the lateral acceleration, a vehicle body slip angle detecting means for detecting a vehicle body slip angle based on a side slip velocity and a longitudinal speed of the vehicle, a spin amount detecting means for detecting a spin amount of the vehicle based on the vehicle body slip angle and the side slip acceleration, a spin state amount detecting means for detecting a turning direction of the vehicle, a reference yaw rate calculating means for calculating a reference yaw rate by using a target yaw rate being calculated at the same time, a drift-out amount detecting means for detecting a drift-out amount of the vehicle based on the reference yaw rate and a yaw rate, a drift-out state amount detecting means for detecting a turning direction of the vehicle, a target slip ratio of a turning front outside wheel detecting means for detecting a target slip ratio of the turning front outside wheel based on the spin state amount, a target slip ratio of a total vehicle detecting means for detecting a target slip ratio of the total vehicle based on the drift-out state amount, a target slip ratio calculating means for calculating a target slip ratio of each wheel by using detected results by the target slip ratio of the turning front outside wheel detecting means and the target slip ratio of the total vehicle detecting means, a final target slip ratio calculating means for calculating a final target slip ratio of each wheel based on a determination of a turning direction of the vehicle, a final target slip ratio determining means for determining whether the final target slip ratio is 0 or not, a target wheel speed calculating means for calculating a target wheel speed of each wheel by using a reference wheel speed and the final target slip ratio of each wheel, a target slip amount calculating means for calculating a target slip amount of each wheel by using the target wheel speed of each wheel, a wheel acceleration of each wheel and the longitudinal acceleration, and a duty ratio detecting means for detecting the duty ratio of each wheel.

\* \* \* \* \*